United States Patent [19]

Martin

[11] Patent Number: 4,743,937
[45] Date of Patent: May 10, 1988

[54] APPARATUS FOR CHARGING TONER PARTICLES

[75] Inventor: Robert G. Martin, Rochester, N.Y.

[73] Assignee: Xerox Corporation, Stamford, Conn.

[21] Appl. No.: 560,691

[22] Filed: Dec. 12, 1983

[51] Int. Cl.$^4$ ............ G03G 15/00; G03G 15/08
[52] U.S. Cl. ................ 355/3 DD; 355/3 CH; 355/3 R
[58] Field of Search ........ 355/3 DD, 3 R, 3 CH; 430/120; 118/651, 656

[56] References Cited

U.S. PATENT DOCUMENTS

| | | | |
|---|---|---|---|
| 3,152,012 | 10/1964 | Schaffert | 118/637 |
| 3,638,613 | 2/1972 | Klavsons et al. | 118/637 |
| 3,804,511 | 4/1974 | Rait et al. | 355/17 |
| 3,854,813 | 12/1974 | Kaufman | 355/10 |
| 3,900,002 | 8/1975 | Stange | 118/637 |
| 3,909,258 | 9/1975 | Kotz | 96/1 R |
| 3,929,098 | 12/1975 | Liebman | 118/637 |
| 4,036,175 | 2/1980 | Phillips . | |
| 4,083,326 | 7/1980 | Kroll et al. . | |
| 4,194,830 | 3/1980 | Ohnuma et al. | 355/3 DD |
| 4,206,064 | 6/1980 | Kiuchi et al. | 430/106 |
| 4,227,796 | 10/1980 | Kamp et al. | 355/3 |
| 4,231,319 | 11/1980 | Waibel et al. | 118/655 |
| 4,337,724 | 7/1982 | Hosono et al. | 118/652 |
| 4,382,420 | 5/1983 | Ohnuma et al. | 355/3 DD |
| 4,407,228 | 10/1983 | Takano et al. | 118/651 |
| 4,459,009 | 7/1984 | Hays et al. | 355/3 DD |
| 4,481,903 | 11/1984 | Haberhavar et al. | 355/3 CH |

Primary Examiner—A. C. Prescott
Assistant Examiner—D. S. Warren
Attorney, Agent, or Firm—E. O. Palazzo

[57] ABSTRACT

This invention is generally directed to an apparatus for charging toner particles comprised in operative relationship of a means for charging insulating toner particles and a means for transporting insulating toner particles, said means for charging and said means for transporting being charged to a predetermined potential, which apparatus further includes therein a brush device for delivering toner particles to a charging nip situated between the means for charging the toner particles and the means for transporting the toner particles. The brush device can also function as a charging source for the toner particles, and as a cleaning system. More specifically in one embodiment the present invention is directed to an apparatus for simultaneously metering, charging and transporting non-magnetic insulating toner particles comprising in operative relationship a metering roll means, an optional trim blade means for said metering roll means, a toner supply reservoir means containing therein weakly charged insulating toner particles possessing about an equal number of positive and negative charges thereon, a transporting hard roll or donor belt means, a triboelectrically active coating contained on said transporting means, a drive roll means, an idler means, a tensioning means, an imaging means, a voltage source means for the metering roll means, a voltage source means for the drive roll means, and the transporting means, said metering roll means moving in a direction opposite to the direction of movement of the transporting means, and wherein the apparatus further includes a moving brush means contained in the toner supply reservoir which brush means contains bristles thereon, wherein the brush transports toner particles to a charging nip situated between the metering roll means and the transporting means.

77 Claims, 5 Drawing Sheets

APPARATUS FOR CHARGING TONER PARTICLES

BACKGROUND OF THE INVENTION

This invention is generally directed to a unique development system, and more specifically, the present invention is directed to an improved apparatus for charging and transporting toner particles to a charging zone situated between a metering charging means such as a metering charging roll and a transporting means. In one embodiment, the present invention is directed to an apparatus and process for simultaneously metering and charging insulating toner particles to a positive or negative polarity, by delivering these particles with a charging brush means, into rubbing contact with a metering charging means, such as a metering charging roll, wherein the toner particles are further charged to either a positive or negative polarity. The brush means contained in the apparatus of the present invention accomplishes a number of operations including, for example, its primary function, that is for transporting toner particles contained in a reservoir or sump, to the metering charging roll nip present in the apparatus involved. Moreover, the brush functions in a manner so as to apply charges to the toner particles contained in the sump in view of the triboelectric relationship between the bristles of the brush means and the toner particles, and further the brush can function as a cleaning mechanism whereby residual toner particles remaining on the donor roll are removed therefrom by the brush which is in contact therewith. Also, the charging brush means which is moving in either a clockwise or counter-clockwise direction, causes the mixing of toner particles contained in the reservoir or sump apparatus.

The development of images by numerous methods, including electrostatographic means is well known. In these systems, toner particles are deposited on an electrostatic latent image contained on an insulating surface such as selenium, using for example, cascade development, magnetic brush development, powder cloud development, touchdown development and other development systems. Generally in these systems two component developer compositions are selected for causing development, that is compositions containing toner particles and carrier particles. As it is known that there are a number of disadvantages associated with two component systems, including additional costs and processing equipment, there has been considerable effort directed to designing systems which utilize toner particles only. Generally, these systems allow the elimination of a developer reservoir, a toner dispenser, and a toner concentration control means.

Single component development systems ae also known, that is, developer compositions comprised of toner resin particles only. The imaging device currently in use generally consume these conductive toner particles, whereby imagewise toner deposition onto the imaging member is obtained by induction toner charging. Electrostatic transfer of conductive toner particles to plain paper is however usually inefficient, that the charge of the toner particles can be reversed by induction charging with plain conductive paper. Electrophotographic systems using conductive single component toner particles therefor usually require a special overcoated paper to achieve electrostatic transport. Moreover, in single component development systems containing conductive toner particles it is difficult to control undesirable background, and background suppression cannot be achieved as the toner particles are inductively charged, and deposited on the image bearing members, which is not the situation in two component development systems wherein the control of background development is accomplished by an electrostatic force acting on the triboelectrically charged toner particles, causing such particles to be directed away from the imaging member.

There is disclosed in U.S. Pat. No. 3,900,002 development systems for developing latent electrostatic images which include a rotating fur brush, the purpose of which is to deliver toner particles to the imaging member. As illustrated in FIG. 1 of this patent, a cylindrical applicator, such as a natural fur brush is selected for incorporation into the apparatus. A similar disclosure is presented in U.S. Pat. No. 3,929,098 wherein there is selected for electrostatic development a brush contained in a developer sump, which brush transfers toner particles to a donor roll. Particles contained on the donor roll are subsequently provided to the photoreceptor imaging member.

There is disclosed in U.S. Pat. No. 3,638,613 a developer apparatus wherein a transfer or donor roll triboelectrically attracts to its surface toner particles contained in a sump or reservoir. Apparently in this apparatus the fur brush is used for the purpose of removing toner particles from the transfer or donor roll and depositing these particles upon a charged surface where the image contained thereon is rendered visible.

Other patents are in existance which disclose the use of various rolls including fur brush rolls for transporting toner particles to various stations in the electrostatographic imaging apparatus. While a similar roll or brush is selected for incorporation into the apparatus of the present invention and while this roll may perform some of the same functions as the prior art rolls, it is the combination of such a roll with a metering charging roll means that the present invention envisions, which combination is not disclosed in the prior art.

There is disclosed in U.S. Pat. No. 4,459,009, the disclosure of which is totally incorporated herein by reference, an apparatus and process for simultaneously metering and charging non-magnetic insulating toner particles, which apparatus comprises in operative relationship a means for simultaneously metering and charging non-magnetic insulating toner particles, a means for transporting the toner particles, a means for supplying nonmagnetic insulating toner particles to the transporting means, a means for applying a bias to the metering charging roll means, a means for applying a bias to the transport means, a means for removing toner particles from the metering charging roll means, wherein toner particles are charged to the appropriate polarity and magnitude in a charging zone situated between the metering charging means and the transport means. The apparatus as described in the co-pending application is sufficient for its intended purposes, however, one disadvantage associated with such an apparatus relates to transporting an appropriate supply of toner particles to the charging roll nip when the apparatus assumes certain configurations in an imaging device.

There thus continues to be a need for improved processes and apparatus for the development of latent electrostatic images wherein improved quality of development is obtained, and which apparatus are efficient, simple in design and economical. Moreover, there continues to be a need for improved single component imaging systems where insulating non-magnetic and colored toner particles are appropriately charged and there is obtained two-component image quality utilizing a single component development method, apparatus and insulative single component toner particles so as to enable the efficient electrostatic transfer of such particles to plain paper, and where there is included in the apparatus a brush means for the primary purpose of pre-charging toner particles contained in a developer sump and transporting these toner particles to a charging nip situated between a metering charging roll and toner transporting means. Additionally, there continues to be a need for improved processes and apparatus wherein single component toner particles are metered onto a transporting member and simultaneously rapidly charged to the desired polarity. Further, there is a need for the provision of an apparatus and process wherein background development is substantially controlled and eliminated by electrostatic forces, and wherein the reliability of the system hardware and materials is increased, which apparatus includes therein a brush means for the primary purpose of pre-charging and mixing the toner particles and transporting these particles to a charging nip. Additionally, there continues to be a need for an apparatus and process which will allow the uniform development of both fine lines and large solid areas of an electrostatic latent image while obtaining minimum background density and wherein the apparatus can be incorporated into a xerographic imaging device in a number of different configurations.

SUMMARY OF THE INVENTION

It is an object of the present invention to provide an improved development apparatus which overcomes the above-noted disadvantages.

It is a further object of the present invention to provide single component development systems wherein two component image quality is obtained.

In a further object of the present invention there is provided a development apparatus wherein toner particles are simultaneously metered and charged by a metering charging means, such as a metering charging roll, and wherein these particles are transported to a nip situated between the metering charging roll and a toner transport means, by a brush means.

In yet a further object of the present invention there are provided apparatuses which allow the rapid charging of toner particles to a desired polarity, either positive or negative, such charging means not being dependent on the interaction of toner particles with numerous carrier particles, and wherein the apparatus includes in addition to a metering charging roll means and a toner transport means, a brush means situated in a toner sump.

In still another object of the present invention there is provided an improved development apparatus wherein a single effective carrier particle or bead, such as a metering charging roll means is selected for the purpose of accomplishing charging of the toner particles, and wherein the toner particles are pre-charged in a reservoir sump and delivered to a charging nip by a brush means.

In still another object of the present invention there is provided a development apparatus containing a brush means which simultaneously cleans or removes residual toner particles from a donor transport means, precharges the toner particles contained in a supply reservoir, and transports the pre-charged toner particles to a charging nip situated between a metering charging roll and a donor transport roll.

These and other objects of the present invention are accomplished by providing an improved apparatus for charging and transporting non-magnetic insulating toner particles, the apparatus containing a moving transporting toner means, such as a donor electrode roll means, and an adjacent electrically biased charging means, such as a charging roll means, which also simultaneously meters toner particles, said means being overcoated with a triboelectrically active material, and moving in a direction opposite to the direction of movement of the transporting means, and wherein there is included in the apparatus a brush means for precharging toner particles contained in a toner reservoir or sump, which brush also simultaneously transports the precharged toner particles to a charging nip situated between the metering charging means and the transporting toner means. Movement of the transporting means directs non-magnetic insulating toner particles to the charging means, and more specifically, to a nip or charging zone situated adjacent the charging means, as illustrated hereinafter, whereat the frictional rubbing between the coating on the charging means, and the toner particles causes such particles to be charged in accordance with the triboelectric relationship existing between the toner particles and the coating material. The application of an electrical bias to the charging means such as a charging roll means, causes electrostatic forces to act on the charged toner particles in close proximity to the entrance of the charging nip or charging zone, thus toner particles which have been charged to the same polarity as the biased roll are electrostatically attracted and directed to the donor means, while toner particles containing the opposite charge, referred to as wrong sign toner, cling to the roll means as a result of electrical attraction forces. Accordingly, the entrance to the charging nip functions similar to an electrostatic toner charge filtering means. The toner particles to be charged in the charging nip require in some machine configurations a mechanism for providing the toner particles at the charging nip. This is accomplished in accordance with the present invention by the selection of a brush means contained in a toner reservoir or toner supply means, which brush is generally moving in a direction opposite to movement of the metering charging roll, causing toner particles contained in the developer sump to be pre-charged, and as a result of the movement of the brush device, toner particles are transported thereon to the charging nip.

The wrong sign charged toner particles referred to hereinbefore which are transported by the charging means in a direction opposite to that of the donor means contacts a doctor blade seal means which remove and return the particles to a developer reservoir. It is highly desirable to remove the wrong sign charged toner particles otherwise these particles will be caused to deposit on the donor means at the exit region of the charging nip, which would adversely affect the charge distribution of the toner particles contained on the donor means, resulting in an adverse affect on image copy quality.

Figure 1:
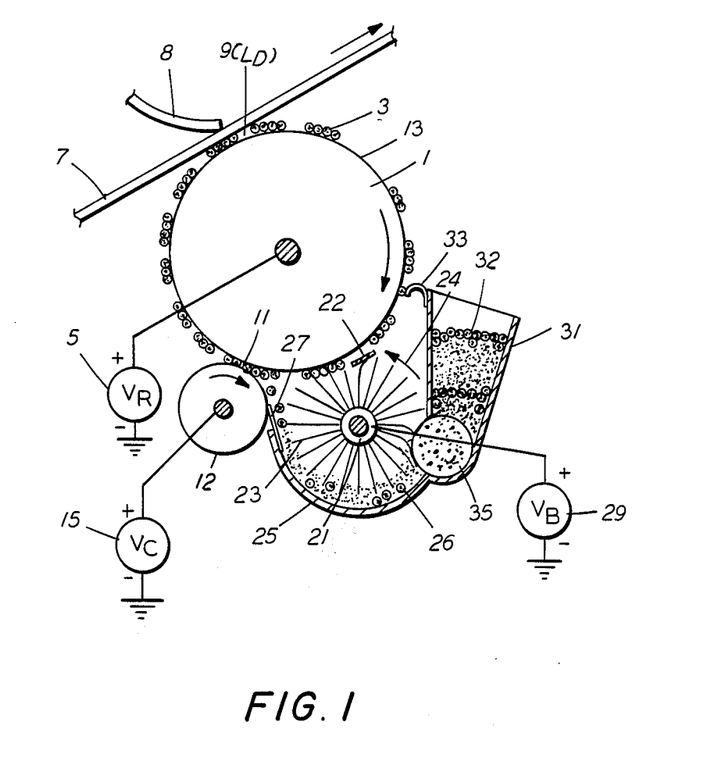
FIG. 1 is a schematic view of an embodiment of the apparatus and process of the present invention.

Additionally, it is believed that the net charge on the toner particles contained in the supply reservoir or development sump is near zero, however, such a charge is distributed with approximately equal number of positive and negative charges as illustrated in FIG. 1. Those toner particles which are electrostatically attracted to the transporting means in the region prior to the charging nip are drawn therethrough while the toner charge is amplified by extensive rubbing between the toner particles and the triboelectrically reactive coating contained on the charging means. This rubbing action provides toner particles with appropriate charge in a rapid time period. Subsequently, the charged toner particles emerge from the charging nip exit and can be conveyed by electrical attraction to the transporting means, to an electrostatic latent image bearing member where they are imagewise deposited thereon, by electrostatic attraction, with unused toner particles remaining on the transporting substrate until they are returned to the toner reservoir.

In a further illustrative embodiment of the present invention there is provided an improved apparatus for simultaneously metering and charging non-magnetic insulating toner particles comprised in operative relationship of a metering charging roll means, a triboelectrically active coating contained on said metering charging roll means, a doctor blade means for said metering charging roll means, a toner supply reservoir means containing therein weakly charged insulating toner particles possessing about equal number of positive and negative charges thereon, a toner transporting donor belt means, a drive roll means, an idler means, a tensioning means, and imaging means, a voltage source means for the metering charging roll means, a voltage source means for the drive roll means, and transport donor belt means, said metering charging roll means moving in a direction opposite to the direction of movement of the transport donor belt means, which apparatus further includes a brush situated in a toner supply reservoir containing toner particles, which brush is moving in a direction opposite to the direction of movement of the metering charging roll, wherein toner particles are pre-charged and transported to a charging nip situated between the charging metering roll and the toner transporting belt means.

In another illustrative embodiment the present invention encompasses an apparatus for simultaneously metering and charging non-magnetic insulating toner particles, which comprises in operative relationship a metering/charging roll means containing thereon a triboelectrically active coating, a toner transporting means, a drive roll means, an idler roll means, said transporting means forming a path of movement around said drive roll means and said idler roll means, a toner supply reservoir means, containing therein weakly charged insulating toner particles possessing about an equal number of positive and negative charges thereon, a voltage source means for the metering/charging roll means, a voltage source means for the drive roll means, and the transporting means, a tensioning means and an imaging member means, wherein the transporting means is positioned so as to maintain a constant fixed distance between said charging/metering roll means and said transport means, and/or is self-spaced from the charging roll means by insulating toner particles, said metering/charging roll means moving in a direction opposite to the direction of movement of the transport means; and an apparatus for metering and charging non-magnetic insulating toner particles comprised in cooperative relationship of a metering/charging roll means, containing thereon a triboelectrically active coating, a compliant transport-donor roll means, a toner supply reservoir means containing thereon weakly charged toner particles, a voltage source means for the metering/charging roll means, and a voltage source means for the compliant roller means, wherein toner particles are charged in a zone encompassed by said metering/charging roll means, and said compliant roll means, said metering/charging roll means moving in a direction opposite to the direction of movement of said compliant roll means, which apparatuses further include therein a brush means contained in a developer supply reservoir, wherein the toner particles present in the reservoir are pre-charged by the triboelectric relationship existing between the bristles of the brush means and the toner particles, and wherein the toner particles are subsequently transported by the brush means to a charging nip situated between a metering charging roll means and the toner transporting means, or wherein the toner particles are subsequently transported by the brush means to a charging nip situated between a metering charging roll means and the compliant toner transporting donor roll means.

The brush means, which also functions so as to cause the desirable mixing of toner particles contained in the developer supply reservoir, can move or rotate in the clockwise or counter-clockwise direction, however, in the preferred embodiment of the present invention, the brush means rotates in a direction opposite to the direction of movement of the toner transporting means.

The present invention in another illustrative embodiment is directed to an electrostatographic imaging device comprised of a charging means, an imaging means, a development means, a fixing means, and a fusing means, the improvement residing in the development means which is comprised of an apparatus for charging toner particles comprised in operative relationship of a means for charging insulating toner particles, and a means for transporting insulating toner particles, said means for charging, and said means for transporting, biased to a predetermined potential; and to a process for charging insulating toner particles which comprises (1) providing a means for charging insulating toner particles, which means contains thereon a triboelectrically active coating, (2) providing a means for transporting toner particles, (3) depositing weakly charged toner particles on the transporting means and (4) contacting the weakly charged toner particles with the triboelectrically active coating in a charging zone situated between the means for charging and the means for transporting, whereat charges on the toner particles are amplified to a positive or negative position, which apparatus and process further includes a brush means containing bristles thereon, which brush is situated in a toner supply reservoir, wherein the toner particles present in the reservoir are pre-charged, and subsequently transported by movement of the brush in a direction opposite to the direction of movement of the charging metering roll means to a charging nip situated between said metering charging roll means and the toner transport means.

The triboelectrically active coating while described herein in some instances as contained on the charging roll, is preferably present on the transporting means. In these embodiments of the present invention charging is effected by rubbing contact of the toner particles with the triboelectrically active coating on the transporting means.

DESCRIPTION OF THE PREFERRED EMBODIMENTS

The process and apparatus of the present invention and various alternative embodiments will now be described with reference to the Figures wherein.

With respect to the Figure description the brush means in each instance is represented by like numerals throughout. Thus, in the Figures there is illustrated a brush 21 containing bristles thereon 23 and preferably rotating in a direction, arrow 24, opposite to the direction of movement of the metering roll, the brush being situated in a toner supply reservoir or toner sump 25 containing toner resin particles 26, which particles have an equal number of positive and negative charges, a toner supply device 31 which supplies toner particles to the toner reservoir 25, a dust seal 33, a trim bar 27, a voltage source 29 for the brush 21, and optionally, a flipper bar 22, for assisting in directing the toner particles to a charging nip. In operation, reference FIG. 1 for example, toner particles in the sump or reservoir 25 are attracted to the moving brush 21, wherein as a result of the triboelectric relationship between the bristles of the brush and the toner particles, the toner particles are triboelectrically charged to a low polarity, and delivered to the nip 11 situated between the metering roll means 12, and the transporting or donor roll means 1. The voltage source means $V_B$ 29 for the brush means generates voltages of from about 50 volts to about 1,000 volts and preferably from about 175 volts to about 250 volts. Moreover, the brush 21 can function as a cleaning device in that it removes residual toner particles situated on the toner transport roll means. Should it not be desired to pre-charge the toner particles with the brush 21, the voltage $V_B$ supplied to the brush 21 would be deactivated, that is, no voltage potential would be applied to the brush, thus substantially no precharging of the toner particles would result. In this configuration, the brush would act primarily as a means for delivering the toner particles to the charging nip situated between the metering charging roll means and the donor transport roll means.

More specifically, there is illustrated in FIG. 1, the apparatus and process of the present invention comprising a hard transporting roll means 1, containing a triboelectrically active coating thereon 13, toner particles 3, a voltage source means 5 for the transporting roll 1, a flexible imaging member means 7, such as a flexible photoreceptor, a pressure blade means 8, a development zone 9, ($L_D$), a metering charging zone 11, a metering roll means 12, a voltage source means 15, ($V_C$), for the metering roll means 12, a brush means 21, brush bristles 23, arrow 24 indicating the direction of movement of the brush means 21, a toner supply reservoir 25, containing therein toner resin particles 26, a trim bar 27, a flipper bar 22, a voltage source means 29, ($V_B$), for the brush means 21, a toner supply device 31, toner particles 32, a dust seal 33, and an optional toner metering roll 35. Alternatively with regard to FIG. 1, the triboelectrically active coating can be contained on the metering roll 12, rather than on the transporting roll 1; and further roll 1 may be comprised of a soft roll.

In one operational sequence, uncharged toner particles 32, contained in the toner supply device 31, are directed to the toner supply reservoir by the optional toner metering roll 35, wherein the toner particles are picked up by the bristles 23 of brush means 21. As a result of the triboelectric relationship between the bristles of the brush and the toner particles, these particles are triboelectrically charged to a low polarlity. Movement of the brush means 21, causes the toner particles to be delivered to the charging nip, or zone 11 situated between the charging roll means 12, and the hard transporting roll means 1. The toner particles are then charged to a suitable negative or positive polarity, as a result of the triboelectric relationship existing between the coating 13, contained on the transporting roll 1, and thereafter, the charged toner particles are transported by transporting roll 1, to the flexible imaging member means 7, wherein the toner particles are desirably transferred to an image contained on the imaging member means 7, in the development zone 9 ($L_D$). The trim bar 27 provides for the removal of toner particles from the metering roll 12, which toner particles are subsequently directed into the toner supply reservoir 25 for recirculation, while the flipper bar 22 assists in directing the toner particles from the bristles 23 of brush 21, to the charging zone 11.

Figure 2:
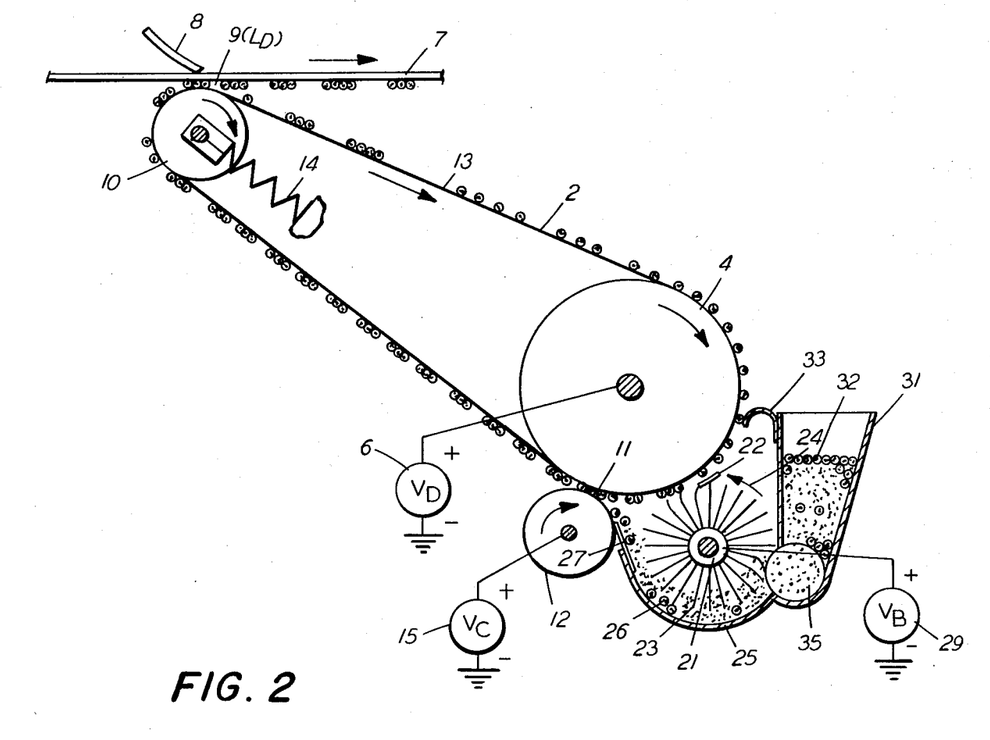
FIG. 2 is a schematic view of another embodiment of the apparatus and process of the present invention.

Illustrative in FIG. 2 is a further embodiment of the apparatus and process of the present invention wherein many of the components are substantially identical to the components as described with reference to FIG. 1, it being noted that the same reference numerals have been selected for FIG. 2 to represent the same or similar components as described with reference to FIG. 1. In FIG. 2, however, in place of the of the hard transporting roll 1 there is included a toner transporting belt means 2, a drive roll means 4, a voltage source means 6 ($V_D$), for the drive roll means 4, an idler roll means 10 and a tensioning means 14.

The apparatus of FIG. 2 functions in the same manner as described with reference to the operation of the apparatus of FIG. 1, with the exception that the toner particles subsequent to being charged in the charging nip 11, situated between the toner transport belt means 2, and the metering roll 12, are transported on the belt means 2, to the flexible imaging member means 7, wherein the toner particles are transferred to an image contained on the imaging member means 7, in a development zone 9 $L_D$. The metering roll means 12, brush means 21, roll means 1, transporting belt means 2 and the flexible imaging member 7, are caused to move by motors not shown.

The deflected toner transporting belt means 2 forms a path around drive roll means 4, and idler roll means 10, which allows the positively charged insulating toner particles 3 to be transported into rubbing contact with an electrostatic latent image not shown, on the flexible imaging member 7. As illustrated, the transporting belt means 2 is subjected to a tensioning means 14, the belt being positioned in such a manner so as to cause it to be wrapped in an arc in close proximity to the metering roll 12, with the donor belt means 2 being self-spaced from the metering roll 12 by the toner particles contained therebetween. Generally, the arc of the toner transport donor belt means 2, is from about 10 degrees to about 75 degrees.

More specifically with further reference to FIG. 2, the positively charged toner particles 3 are transferred from the toner transport donor belt means 2 to the flexible imaging member means 7, as a result of a voltage of from about 400 volts DC to about 600 volts DC, and the imagewise attraction for such particles by the imaging member 7, charged to a negative potential. Pressure blade 8 provides a sufficient force to ensure intimate contact of the positively charged toner particles 3, with the imaging member 7 for the distance in the development zone 9 designated by $L_D$, the imaging member 7 being self-spaced from the toner transport means 2 by the positively charged insulating toner particles 3, contained therebetween. Unused toner particles 3 not deposited on the imaging member 7 are returned to the toner supply reservoir 25 and in on feature of the present invention can be removed from the transporting means 2 by the bristles 23 of brush 21.

The triboelectric coating 13 contained on the transporting roll 1, which coating may alternatively be present on the metering roll 12, generally has dispersed therein a charge dissipating material such as carbon black for the purpose of accepting and eliminating negative charges from the toner particles 3. When it is desired to impart a negative polarity to the toner particles 3, the coating 13 is selected so as to have a negative triboelectric relationship with the toner particles 3, that is it is electropositive, and the voltage $V_D$ is negative instead of positive. When, for example, a positive potential DC of about 100 volts is applied to the transporting roll means 2, those toner particles with a positive charge are electrostatically deposited on the belt means 2, at the entrance to the charging zone 11, and frictional rubbing in the zone of the toner particles with the triboelectric coating 13 increases the positive charges on the insulating toner particles as a result of triboelectric charging between the coating 13, which is comprised of an electronegative material in this illustrative embodiment, and the electropositive toner particles 3. These toner particles contain a relatively low triboelectric charge as a result of the contact of the uncharged toner particles with the bristles 23 of brush 21. The positively charged toner particles emerging from the charging zone 11, adhere to the donor belt means 2, primarily as a result of electrostatic attraction thereon.

While it is not desired to be limited by theory, it is believed that the toner particles contained in the toner supply device 31 are essentially neutral in that these particles are comprised of an approximately equal number of weakly positive charges and weakly negative charges. Subsequently, these neutrally charged toner particles have a further charge applied thereto as a result of the triboelectric relationship between the bristles 23 of brush 21 and the toner particles, and thereafter these toner particles as a result of movement of the brush 21, are directed to the charging zone 11, wherein they are further charged to a higher triboelectric polarity as a result of the rubbing contact between these particles and the triboelectric coating 13, contained on the transporting roll 2. This further charging occurs in the charging zone 11 situated between the metering roll 12 and the transporting belt means 2. The weakly positively charged toner particles 3 thus lose negative charges and gain positive charges as a result of their rubbing contact with the triboelectric coating 13, in the charging zone 11. The resulting positively charged toner particles adhere to the transporting belt 2, as they migrate to the imaging member 7, which adherence results primarily in view of the electrostatic attraction of the toner particles to the roll 1, and transport belt 2, thus additives such as magnetic pigments are not needed.

An important feature of the present invention resides in the brush 21, containing bristles 23 thereon. This brush means which can rotate in a clockwise or counter-clockwise direction, but preferably rotates in a direction opposite to the direction of movement of the transporting roll 1, or the toner donor belt means 2, provides a number of functions in the process and apparatus of the present invention. One primary function of the brush means 21 is for imparting a triboelectric charge to the uncharged toner particles 26. Moreover, the brush means 21 enables the toner particles to be moved to a charged zone 11, situated between the metering roll 12, and the transporting roll 1, or the transporting belt means 2. Furthermore, the brush means 21 enables the desirable suitable mixing of toner particles and serves in one embodiment to remove the uncharged toner particles from the transporting roll 1, or the transporting donor belt means 2, as illustrated with reference to FIGS. 1 and 2. While the apparatus is described with reference to a brush means 21, other suitable means may be used for accomplishing similar purposes, thus, known paddle wheels can be selected, providing the objectives of the present invention are achieved.

The brush 21 can be comprised of numerous suitable substances including nylon, stainless steel, brass, composite materials comprised of nylon with carbon, nylon with brass, or nylon with steel and the like. Generally, these brushes are commercially available and can be obtained from numerous sources such as Mill Rose Company, of Ohio. The speed of the brush depends upon for example, the speed of movement of the other components of the apparatus and process of the present invention. Generally, however the brush moves at a speed of from about 200 revolutions per minute to about 1,500 revolutions per minute, and preferably at a speed of from about 200 revolutions per minute to about 500 revolutions per minute. The voltage VD applied to the brush means 21, is generally from about 50 volts to about 1,000 volts, and preferably this voltage is from about 200 volts to about 400 volts. The brush can be suitably situated so as to contact the transporting roll 1, or the transporting belt means 2, for the purpose of removing toner particles therefrom, as indicated hereinbefore. In such an embodiment, the distance maintained between the brush means 21 and the transporting means, is from about 125 microns to about 600 microns.

Figure 3:
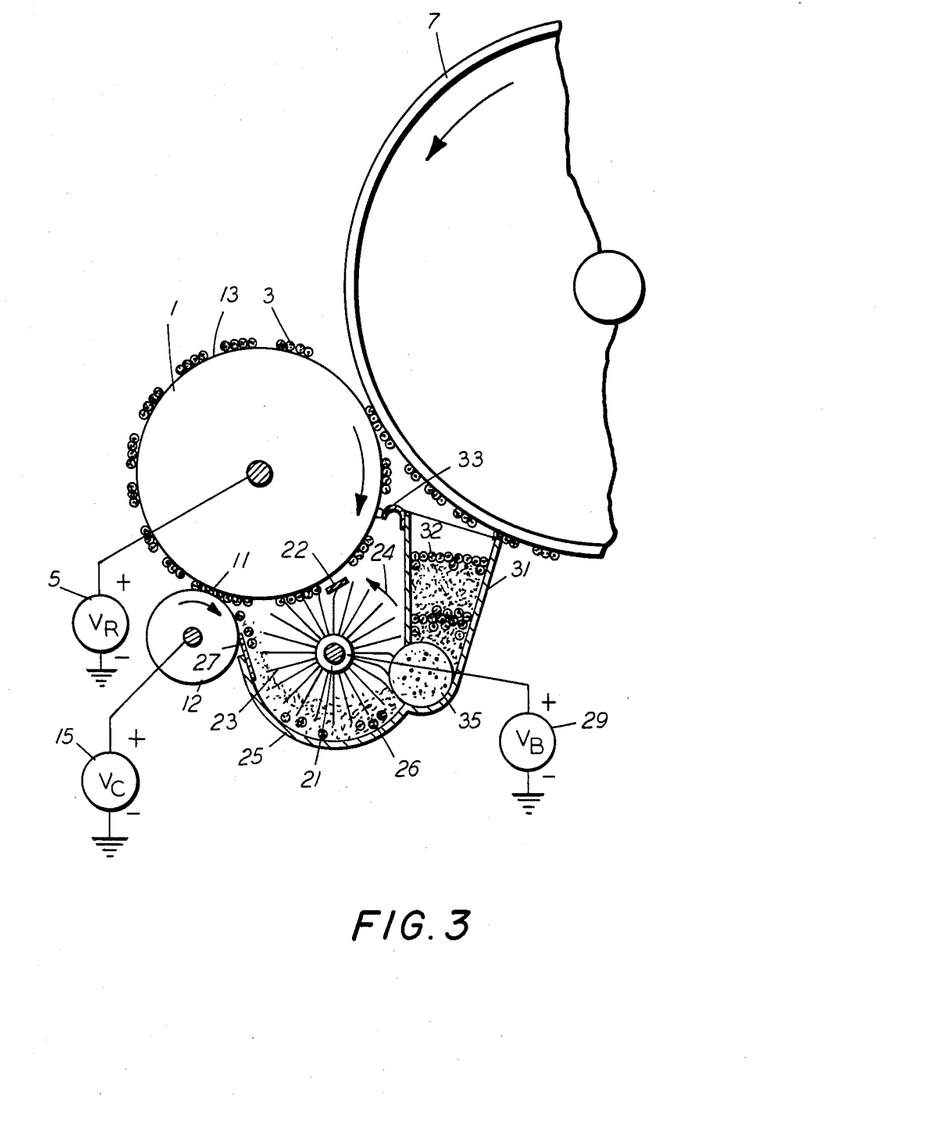
FIG. 3 is a schematic view of a further embodiment of the apparatus and process of the present invention.

Illustrated in FIG. 3 is essentially the same process and apparatus with reference to FIG. 1 with the exception that in FIG. 3 the transporting roll 1 is comprised of a soft material, and the imaging member 7 rather than being a flexible imaging member is comprised of a photoreceptor drum such as amorphous selenium deposited on an aluminum substrate. The process and apparatus illustrated with reference to FIG. 3 operates in essentially the same manner as described herein with reference to FIG. 1.

Figure 4:
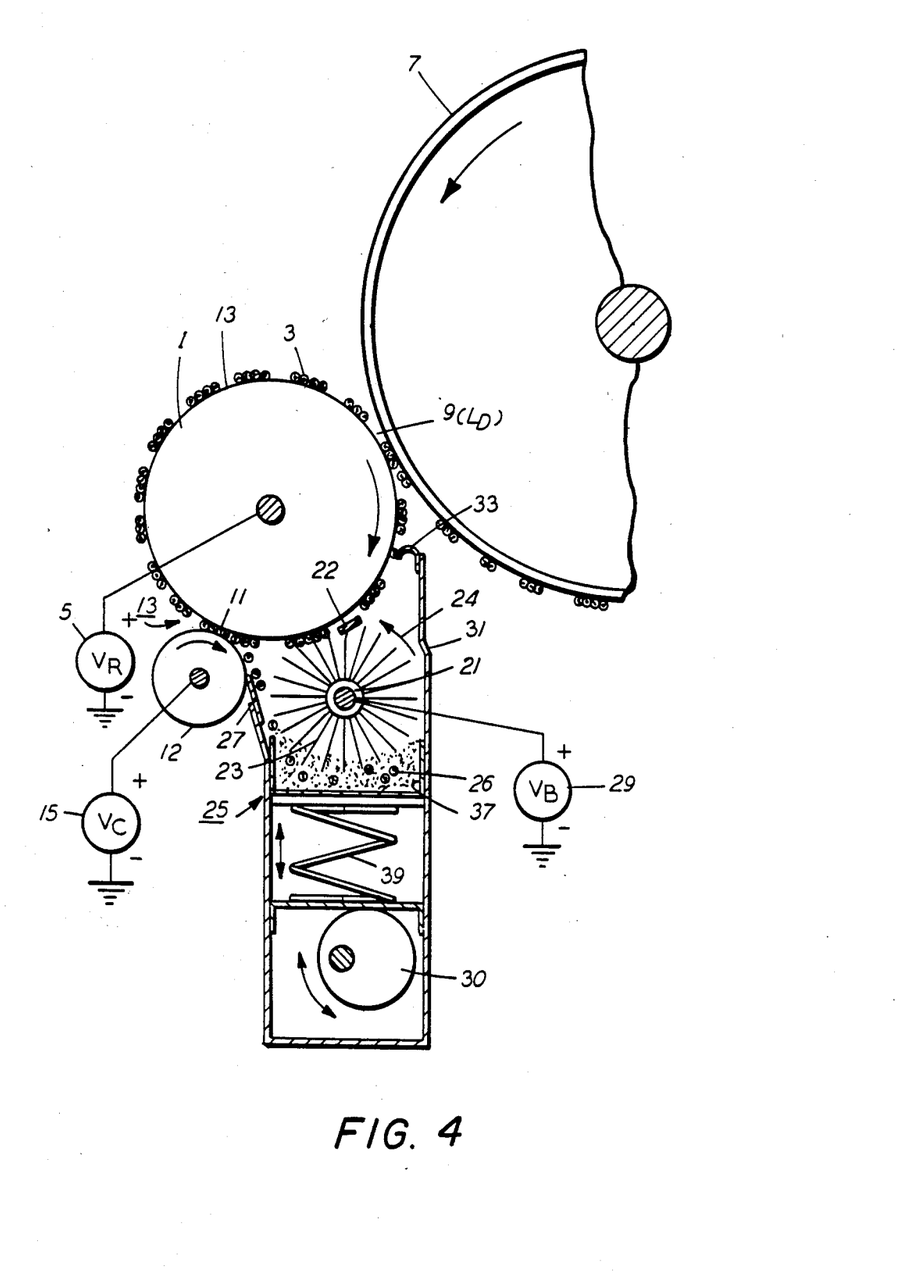
FIG. 4 is a schematic view of a further embodiment of the apparatus and process of the present invention.

Illustrated in FIG. 4 is a further embodiment of the process and apparatus of the present invention, substantially equivalent to the process and apparatus as illustrated with reference to FIG. 3 with the exception that in FIG. 4 there is included a toner cassette 37, containing toner particles therein, and means 39 for moving this cassette. More specifically, there is illustrated in FIG. 4 a soft transporting roll 1, toner particles 3, a voltage source means 5 for the transport roll 1, containing a triboelectrically active coating 13 thereon, an imaging member 7 comprised of a photoreceptor drum, containing for example, amorphous selenium, or an amorphous selenium alloy deposited on an aluminium substrate, development zone 9, a metering charging zone 11, a metering charging roll 12, a voltage source means 15 for the metering roll 12, a brush means 21, containing bristles 23 thereon a toner supply reservoir 25, containing toner resin particles therein, a trim bar 27, a flipper bar 22, a voltage source means 29, for the brush means 21, a cassette 37, which contains uncharged toner particles therein, and a means for moving this cassette into close proximity to the brush means 21, which means can include a spring, or elevator device 39, or other similar devices including levers, and cam 30. In one mode of operation the toner cassette can be preloaded with the desired toner composition as either a single unit, or in combination with the photoreceptor as a development cassette. Specifically in operation the toner cassette which is located below the transporting brush and sump is activated by a mechanical arm, cam or spring arrangement, reference cam 30, causing an upward motion to the base of the cassette. This causes toner paricles to be added to the sump. The amount of toner added depends primarily on the distance traveled by the cassette. Further the cassette mechanism could be mechanically operated from the imaging apparatus drive system, and be activated by the imaging apparatus computer logic, copy counter, or sensing device. At each interval, sufficient toner would be added to maintain copy throughput without for example excessively flooding the brush.

Figure 5:
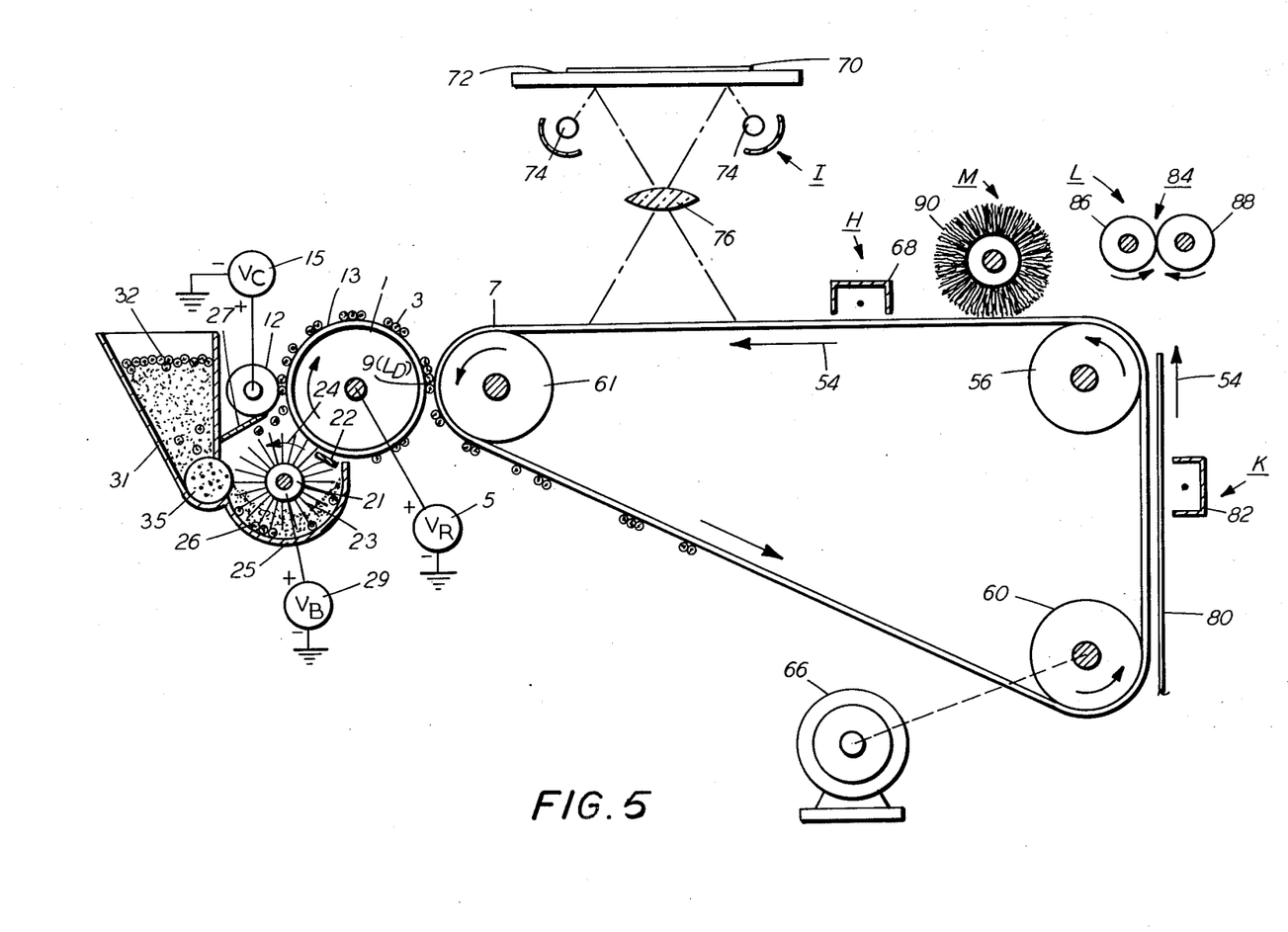
FIG. 5 is a schematic view illustrating the use of the apparatus and process of the present invention as shown in FIG. 1 in an electrostatographic imaging system.

The apparatus and process of the present invention can be utilized in various imaging systems, including electrostatic latent imaging systems as shown for example in FIG. 5. In FIG. 5 there is illustrated a xerographic imaging system generally designated 50, employing an imaging member 52, which corresponds to the imaging member 7 of FIG. 1. In this embodiment of the present invention, the imaging member 52 can be comprised of a substrate, a generating layer of trigonal selenium optionally dispersed in an active resinous binder overcoated with a transport layer containing N,N,N',N'-tetraphenyl-[1,1'-biphenyl]4,4'-diamine, or similar diamines dispersed in a polycarbonate. Imaging member 52 moves in the direction of arrow 54 to advance successive portions of the imaging member sequentially through the various processing stations disposed about the path of movement thereof. The imaging member is entrained about a sheet-stripping roller 56, drive roller 60 and rollers 61 and 63. The system can also include a tensioning means, not shown, for the purpose of maintaining imaging member 52 at the desired flexibility or pressure, which level of tension is relatively low permitting member 52 to be easily deformed. With continued reference to FIG. 5, drive roller 60 is mounted rotatably and in engagement with member 52. Motor 66 rotates roller 60 to advance member 52 in the direction of arrow 54. Roller 60 is coupled to motor 66 by suitable means such as a belt drive. Sheet-stripping roller 56 is freely rotatably so as to readily permit member 52 to move in the direction of arrow 54 with a minimum of friction.

Initially, a portion of imaging member 52 passes through charging station H. At charging station H, a corona generating device, indicated generally by the reference numeral 68, charges the photoconductive surface of imaging member 52 to a relatively high, substantially uniform potential.

The charged portion of the photoconductive surface is then advanced through exposure station I. An original document 70 is positioned face down upon transparent platen 72. Lamps 74 flash light rays onto original document 70, and the light rays reflected therefrom as transmitted through lens 76 forming a light image thereof. Lens 76 focuses the light image onto the charged portion of the photoconductive surface to selectively dissipate the charge thereon. This records an electrostatic latent image on the photoconductive surface, which corresponds to the informational areas contained within original document 70.

Thereafter, the imaging member 52 advances the electrostatic image recorded thereon to station J wherein it is contacted with positively charged insulating toner particles 3, station J including essentially all the components as shown in FIG. 1, namely, in summary a transporting hard roll means 1, containing thereon a triboelectrically active coating 13, toner particles 3, a voltage source means 5 for the transporting roll 1, a development zone 9, a metering charging zone 11, a metering roll 12 and voltage source means 15 for the metering charging zone 12, a brush means 21 containing bristles 23 thereon, a toner supply reservoir 25, containing therein toner resin particles 26, a flipper bar 22, a trim bar 27, a voltage source means 29, for the brush means 21, a toner supply device 31, toner particles 32, a dust seal 33, and an optional toner metering roll. The details for precharging, and charging and metering the toner particles, deposition thereon upon an imaging member is illustrated in details with reference to FIGS. 1 and 2. Station J can be situated at various suitable clock positions with respect to the imaging member 7, including the 12 o'clock, 3 o'clock, 6 o'clock, and 9 o'clock areas.

Imaging member 52 then advances the toner powder image to transfer station K. At transfer station K, the sheet of support material 80 is moved into contact with the toner powder image, which sheet is advanced to transfer station K by a sheet feeding apparatus (not shown). Preferably, the sheet feeding apparatus includes a feed roll contacting the uppermost sheet of a stack of sheets. The feed roll rotates so as to advance the uppermost sheet from the stack into a chute, which chute directs the advancing sheet of support material into contact with the photoconductive surface of member 52 in a timed sequence in order that the toner powder image developed thereon contacts the advancing sheet of support material at transfer station E.

Transfer station K includes a corona generating device 82 which sprays ions onto the backside of sheet 80, allowing for the attraction of the toner powder image from the photoconductive surface to sheet 80. After transfer, sheet 80 moves in the direction of arrow 54 onto a conveyor (not shown) to fusing station L.

Fusing station L includes a fuser assembly, indicated generally by the reference numeral 84, which permanently affixes the transferred toner powder image to sheet 80. Preferably, fuser assembly 84 includes a heated fuser roller 86 and a back-up roller 88. Sheet 80 passes between fuser roller 86 and back-up roller 88 with the toner powder image contacting fuser roller 86. In this manner, the toner powder image is permanently affixed to sheet 80. After fusing, a chute guides the advancing sheet 80 to a catch tray for subsequent removal from the printing machine.

Invariably, after the sheet of support material is separated from the photoconductive surface of imaging memer 54, some residual particles remain adhering thereto. These residual particles are removed from the rotatably mounted fibrous brush 90 in contact with the photoconductive surface. The particles are cleaned from the photoconductive surface by the rotation of brush 90 in contact therewith. Subsequent to cleaning, a discharge lamp (not shown) floods the photoconductive surface of member 52 with light to dissipate any residual electrostatic charge remaining thereon prior to the charging thereof from the next successive imaging cycle.

It is believed that the foregoing description is sufficient for purposes of the present invention to illustrate the general operation of an electrophotographic printing machine incorporating the features of the present invention therein.

In another feature of the process and apparatus of the present invention there can be included therein a toner auger which serves to direct in a controlled manner toner particles to the brush means 21. More specifically, the toner auger suitable for this application could consist of a hollow tube extending the entire length of development, and having holes of an appropriate size and shape to evenly distribute toner into the brush sump. At one end of the auger there would be situated a supply sump or cartridge of new toner. A rotating screw type mechanism would be fitted inside the tube extending from the toner supply to the end of development. As the screw rotates toner flow, the supply travels from the supply area to the holes in the tube where it is released into the brush sump. The toner auger and associated parts can be fabricated from plastic, metal materials, and the like.

With regard to FIG. 1 the auger could be located in a clock position of from 1 to 3 o'clock for example, or at a position near arrow 24. The auger would be operated in a manner to maintain sufficient toner for copy throughput, and timed or sensed from the imaging apparatus logic.

The core of the metering roll means 12 can be hollow or solid, and can be comprised of numerous known suitable materials including for example, aluminum, electroformed nickel, steel, iron, polymeric materials and the like, providing they are of sufficient strength to be operable in the system. The preferred core materials are aluminum and electroformed nickel. Generally the radius of the core is from about 0.25 inches to about 2 inches, and preferably is from about 0.5 inches to about 1 inch. Idler roll means 22 can be comprised of the same materials as roll 12, this roll ranging in diameter of from about 0.25 inches to about 1 inch.

The coating 13 for the transport roll, or alternatively contained on the metering roll means 12, which roll then also functions as a charging means, can be selected from numerous suitable materials known in the art, including many of the same materials that are employed for coating carrier particles. The coating is selected according to the charge that is desired to be imparted to the toner particles, thus if it is desired to impart a positive charge to the toner particles, a coating capable of acquiring a negative charge thereon is employed, these coatings including various electronegative materials such as polymers, including copolymers of trifluorochloroethylene and vinyl chloride commercially available as FPC 461. Examples of other electronegative materials that can be employed include highly halogenated polymers, such as polyvinylidene fluoride, polytetrachlorofluoroethylenes, perfluoroalkoxylated ethylenes, polytetrafluoroethylenes, polyvinyl chlorides and the like. Should it be desired to impart a negative charge to the insulating toner particles, a coating capable of acquiring a positive charge thereon is employed; examples of such coatings including various electropositive materials like polyvinylpyridenes, terpolymers of methacrylates, such as polymethylmethacrylate, polystyrene/n-butylmethacrylate silane terpolymer, polycaprolactum, and the like. Additionally, there can be employed as coatings 13, materials analogous to thermoplastic toner resins, as described hereinafter, containing charge control agents for the purpose of imparting a positive or negative charge to the toner particles 17. Various suitable charge control agents can be employed, including alkylpyridinium halides, such as cetyl pyridinium chloride, quaternary ammonium compounds as disclosed in U.S. Pat. No. 3,970,571, morpholinium compounds, hydrazonium compounds, and the like. Generally, the charge control agent is present in an amount of from about 0.1 percent to abuot 10 percent.

The thickness of the coating 13 can vary over a wide range and is dependent on many factors including economical considerations, however, generally the thickness of the coating is from about 0.1 mils to about 5 mils and preferably is from about 1 mil to about 3 mils. In a preferred embodiment, the thickness of the coating 13 is 1 mil, as such a thickness, particularly when employed in the embodiments of the present invention, resulted in superior overall performance.

The hard transporting roll 1, illustrated in FIG. 1, can be comprised of numerous suitable materials including, for example, a center core consisting of steel, and a sleeve of electroformed nickel, in a thickness of from about 3 mils to about 30 mils. For softer rolls, reference FIG. 3 for example, the thickness of the sleeve of electroformed nickel is less than about 3 mils. Other suitable materials can be selected including aluminium, polyether sulfone, composite metals, known plastics, metalized polyether sulfone, aluminum coated plastics, conductive plastics, and the like. Nearly any stable plastic and conductive metal can be used providing the objectives of the present invention are achieved.

To insure proper charging in the charge roll/donor roll nip, and in the donor roll/photoreceptor nip, it is preferred to maintain roll alignment and uniform roll pressure. This may be accomplished with combinations of springs and selfaligned hard rolls. A sponge rubber or plastic, such as silicon sponge rubber, or polyurethane foam core in combination with a conformable (thin wall) tube sleeve in place of solid or thick wall (greater than 0.0055) rolls may also be used. A foam core in combination with a thick wall sleeve and combinations of foam and springs may also be considered depending upon the configuration desired. With proper tension applied from either a spring or foam rubber, constant roll pressure and charging is insured; and contamination from the loss of toner particles is prevented. Silicon rubber, Viton or other sealing materials can also be fitted to the ends of the roll to further prevent toner loss and contamination.

The donor belt means 2 illustrated, for example, in FIG. 2 can be comprised of numerous suitable materials including, for example, aluminized Mylar overcoated with a carbon black loaded paint (polymer matrix), or dopants which are conductive agents for the polymers, such as quaternary ammonium salts, a seamless electroformed nickel belt overcoated with Krylon ultraflat black paint, commercially available as Krylon 1602, a seamless extruded polymer sleeve containing a conductive agent such as carbon black, or a bare electroformed nickel sleeve processed in a manner which imparts a texture to the surface. It is preferred that the belt be seamless to prevent toner metering defects. The peak-to-peak variation in the surface texture on the donor belt means 2 ranges from about 0.5 micrometers to about 5 micrometers, with a spatial variation ranging from about 5 micrometers to about 100 micrometers. The length of the donor belt is dependent on the configuration within which it is used, generally however, this length varies from about 4 inches to about 20 inches. As indicated herein the donor belt means 2 in FIG. 2 forms an arc in relationship to roll 12.

The drive roll means 4 in FIG. 2 is generally comprised of a conductive material, such as conductive rubber and the like, this roll having a diameter of from about 0.25 inches to about 1.5 inches, and preferably from about 0.5 inches to about 1 inch. The drive roll means 4 and idler roll means 10 of FIG. 2 are generally comprised of many conductive rubber segments formed by slots in both the circumferential and axial directions, which rubber segments enable tracking of the donor belt with the aid of belt edge guiding members. The compliant donor roll 21 shown in FIG. 3 generally consists of an elastic core, such as polyurethane foam or silicone rubber, overcoated with a seamless, flexible and conductive sleeve such as electroformed nickel or a carbon black loaded, extruded polymer. The conductive sleeve such as electroformed nickel can be overcoated with materials described hereinbefore for the donor belt 2 shown in FIG. 2.

Illustrative examples of the image bearing member means 7 include inorganic and organic photoreceptor materials such as amorphous selenium, selenium alloys, including alloys of selenium-tellurium, selenium arsenic, selenium antimony, selenium-tellurium-arsenic, cadmium sulfide, zinc oxide, polyvinylcarbazole, layered organic photoreceptors, such as those containing as an injecting contact, carbon dispersed in a polymer, overcoated with a transport layer, which in turn is overcoated with a generating layer, and finally an overcoating of an insulating organic resin, such as those described in U.S. Pat. No. 4,251,612. Also, included within the scope of the present invention are imaging members comprised of a substrate, a transport layer such as a diamine dispersed in a polymer and a generating layer such as trigonal selenium as described in U.S. Pat. No. 4,265,990, the disclosure of which is totatlly incorporated herein by reference.

Other organic photoreceptor materials include, 4-dimethylamino-benzylidene, benzhydrazide; 2-benzylidene-amino-carbazole, 4-dimethyl-amino-benzylidene, 2-benzylidene-amino-carbazole, polyvinyl carbazole; (2-nitro-benzylidene)-p-bromo-aniline; 2,4-diphenyl quinazoline; 1,2,4-triazine; 1,5-diphenyl-3-methyl pyrazoline 2-(4'-dimethyl-amino phenyl) benzoxazole; 3-amino-carbazole; polyvinylcarbazole-trinitrofluorenone charge transfer complexes; phthalocyanines and mixtures thereof, and the like. Generally, positively charged toner compositions are employed when the photoreceptor is charged negatively as is the situation with most organic photoreceptors, while negatively charged toner particles are employed when the photoreceptor is charge positively, as is the situation with most inorganic photoreceptors such as selenium.

By flexible imaging member as used herein is meant generally a material that can be easily deformed, such as the members as described in U.S. Pat. No. 4,265,990. Examples of the use of flexible imaging members is shown in FIGS. 1 and 2. In contrast, a rigid imaging member as shown in FIG. 3 cannot be easily deflected, such members being stiff or hard, like amorphous selenium which has not been deposited on a flexible substrate.

The speed ratios of the components, the charging zone length, the development zone length, the voltages $V_c$, $V_B$, and other parameters of the apparatus and process of the present invention may vary depending on the configuration within which they are used. Thus for example, with reference to FIGS. 1 and 2, the speed ratio of the metering roll 12 to roll 1, or belt 2 varies from about $-4$ to about $-1$, and preferably is from about $-2$ to about $-3$. Accordingly, the metering roll 12 in this embodiment is moving at a more rapid rate of speed than the speed of the donor belt 2. In this embodiment, the speed ratio of the donor belt means 2 to the imaging member means 7 ranges from about 1 to about 4 and preferably is from about 2 to about 3, accordingly, the donor belt means 2 is moving from about 1 to about 4 times faster than the flexible photoreceptor imaging member means 7.

With further reference to FIG. 2, the speed ratio of the charging roll 12, to the donor belt 2 can range from about $-2$ to zero and is preferably from about $-\frac{1}{2}$ to $-\frac{1}{3}$. Accordingly, in this embodiment, donor belt 2 is moving from about 2 times as fast as the metering roll 12, to a speed that is equal to the speed of the metering roll 12. In reference to FIG. 3, the speed ratios of the metering roll 12, and compliant donor roll 20 are essentially identical to the speed ratio as described herein with reference to these components in FIG. 2.

With further reference to FIG. 1, the length $L_c$ of the metering/charging zone 11 is from about 0.05 inches to about 1 inch, and is preferably from about 0.3 inches to about 0.5 inches, while the length of the development zone 9 ($L_D$) is from about 0.05 inches to about 0.5 inches, and is preferably from about 0.06 inches to about 0.1 inch. These distances can be greater or less providing they accomplish the objectives of the present invention.

The pressure in the charging zone 11 between the roll 12 and donor belt 2 is obtained by dividing the tension per unit width of donor belt 2 as applied by a spring, by the radius of the roll. Generally, the pressure ranges from about 0.1 about 1 pound per inch squared, and is preferably from about 0.2 pound per inch squared to about 0.7 pound per inch squared. The pressure in the development zone 9 between the donor belt 2 and imaging member 7, which pressure is applied by a pressure blade 8 should be of sufficient magnitude to allow the toner particles to continually contact the imaging member. Generally, this pressure ranges from about 1 pound per inch squared to about 10 pounds per inch squared, and is preferably from about 2 pounds per inch squared to about 4 pounds per inch squared.

For a positive toner charging system, the voltage $V_c$ ranges from about $+25$ volts to about $+200$ volts and is preferably from about +75 volts to about +125 volts. The voltage $V_B$ generally is from about +75 volts to about +450 volts or from about −75 volts to −450 volts and is preferably from about −200 volts to −250 volts for photoreceptors negatively charged to an image potential of approximately −500 volts and a background potential of approximately −100 volts. The photoreceptor potentials are typical for an organic photoreceptor approximately 27 micrometers thick with a dielectric constant of 3.

With reference to the apparatus shown in FIG. 2, the speed ratio in a preferred embodiment is −3, the voltage $V_c$ is +100 volts, the voltage $V_B$ is −250 volts, the speed of the donor belt 2 to the imaging member 7 is +2, the nip length $L_c$ is 0.4 inches, and the nip length $L_D$ is 0.08 inches.

The preferred photoreceptor for the process configuration shown in FIG. 1 is a flexible layered device as disclosed for example in U.S. Pat. No. 4,265,99, and the donor roll is a compositive aluminum/foam core of a thickness of 0.008 inches in an electroformed nickel sleeve, which sleeve is coated in a thickness of about 0.001 inches, with Teflon "S" commercially available, containing dispersed carbon black particles. Also the distance between the photoreceptor-donor roll is about 0.050 inches. With further reference to FIG. 1 the charge roll in a very preferred embodiment is fabricated with a 0.008 inch thick nickel electroformed sleeve with aluminum end plugs as a core to support the drive shafts, the trim blade is a 0.002 inch shim stock insulated with Teflon tape to electrically isolate it from the aluminum sump, and the transport brush in the sump is one of a number of compositive brushes produced by Mill-Rose Company, wherein the brushes are about 1.75 inches in diameter with bristles about 0.500 inches long, and about 0.007 inches in diameter. The brush as indicated herein operates in either direction at a normal speed of about 500 revolutions per minute in one embodiment. Ideally the brush is located in a position so as to transport toner, disturb the residual image and allow the lowest possible revolutions per minute to insure reload. Item 31 in FIG. 1 shows a typical toner supply sump with a metering roll in place for deposition of toner particles in the transport sump.

In each illustration, the final charging of the toner particles occurs in a charging zone situated between the metering roll, and a second component such as a donor belt or another roll. These components are self-spaced from each other by the toner particles situated therebetween, such spacing generally being equivalent to about one layer of toner particles. This distance may be less or more than one layer of toner particles, however, numerous layers may be undesirable in that the bottom layers, those furthest removed from roll 12, may not be adequately charged.

The amount of toner particles 3 metering onto the roll, or the donor belt means 2 can be controlled as desired by varying the parameters of the system, however, generally the amount of toner particles deposited depends primarily on the following factors:

1. The triboelectric charging relationship between the coating 13 and insulating toner particles 3.
2. The metering roll bias $V_c$.
3. The relative speed ratios between the metering roll means 12, and the donor belt means 2 or roll 1.
4. The length of the nip distance ($L_c$) between the metering roll means 12 and the donor belt means 2 or roll 1.
5. The amount of pressure applied to the donor belt means 2. For example, if a high amount of pressure is applied there is virtually no spacing between the metering roll means 12 and the donor belt means 2, thus preventing toner particles 3 from moving into the charging nip $L_c$.
6. The degree of surface texture on the donor belt means 2.
7. The speed of rotation of the brush means 21 and the amount of voltage $V_B$, if any, applied to the brush means 21.

Generally, the amount of toner particles deposited on the donor belt means 2 or roll 1 can range from about 1 monolayer of toner particles to several layers of toner particles. The amount of toner particles deposited can, for example, range from about 0.1 milligrams per centimeter squared to 3 milligrams per centimeter squared and is preferably from about 0.5 milligrams per centimeter squared to 1 milligram per centimeter squared. The thickness of the toner layer deposited as indicated hereinbefore determines the distance between the metering roll and the donor belt or other roll as shown in the figures.

As the toner layer is transported by movement of the donor belt, for example, the rubbing length between the toner and metering/charging roll is represented by the expression $Lr=[V−1]L_c$ wherein V is the ratio of the metering/charging roll speed to the donor speed and $L_c$ is the length of the toner charging zone 11. As V is negative for the two surface moving in opposite directions, a rubbing length of 1.6 inches is obtained when V is equal to −3 and $L_c$ is equal to 0.4 inch. The rubbing length needed for adequate toner charging depends, for example, primarily on the charging nip pressure, and the triboelectric charging between the toner and metering/charging roll. The charging nip pressure is established by the belt tension, and the radius of the metering/charging roll, it being noted that additional pressure can be supplied by a foam pad positioned against the back of the donor.

The development system described herein does not require magnetic toner, however, a mechanical and/or electrical means can be used to seal the ends of the development unit. Any material such as foam or felt are suitable for this purpose. A magnetic seal with ferrofluid represents another sealing method. Furthermore, magnetic sealing could be obtained by simply using magnetic (insulating) toner and appropriate magnets.

The agitated toner particles contained in the toner reservoir can comprise numerous suitable insulating materials, and more specifically toner resins and colorants. Further, there can be contained in the toner composition charge enhancing additives, which will provide a mechanism by which the toner particles can be rapidly charged while at the same time maintaining such a charge.

Illustrative examples of resin materials include for example, polyamides, epoxies, polyurethanes, vinyl resins and polymeric esterification products of a dicarboxylic acid and a diol comprising a diphenol. Any suitable vinyl resin may be employed in the toners of the present system including homopolymers or copolymers of two or more vinyl monomers. Typical of such vinly monomeric units include: styrene, p-chlorostyrene vinyl naphthalene, ethylenically unsaturated mono-olefins such as ethylene, propylene, butylene, isobutylene and the like; vinyl esters such as vinyl chloride, vinyl bromide, vinyl fluoride, vinyl acetate, vinyl propionate, vinyl benzoate, vinyl butyrate and the like; esters of alphamethylene aliphatic monocarboxylic acids such as methyl acrylate, ethyl acrylate, n-butylacrylate, isobutyl acrylate, dodecyl acrylate, n-octyl acrylate, 2-chloroethyl acrylate, phenyl acrylate, methyl-alpha-chloroacrylate, methyl methacrylate, ethyl methacrylate, butyl methacrylate and the like; acrylonitrile, methacrylonitrile, acrylamide, vinyl ethers such as vinyl methyl ether, vinyl isobutyl ether, vinyl ethyl ether, and the like; vinyl ketones such as vinyl methyl ketone, vinyl hexyl ketone, methyl isopropenyl ketone and the like; vinylidene halides such as vinylidene chloride, vinylidene chlorofluoride and the like; vinylidene halides such as vinylidene chloride, vinylidene chlorofluoride and the like; and N-vinyl indole, N-vinyl pyrrolidene, styrene- butadiene copolymers, and the like, and mixtures thereof.

Also esterification products of a dicarboxylic acid and a diol comprising a diphenol may be used as a preferred resin material for the toner composition of the present invention. These materials are illustrated in U.S. Pat. No. 3,655,374, totally incorporated herein by reference, the diphenol reactant being of the formula as shown in Column 4, beginning at line 5 of this patent and the dicarboxylic acid being of the formula as shown in Column 6 of this patent. The resin present in amount so that the total of all ingredients used in the toner total about 100 percent, thus when 5 percent by weight of the alkyl pyridinium compound is present and 10 percent by weight of pigment such as carbon black is present, about 85 percent by weight of resin material is used.

The toner resin particles can vary in diameter, but generally range from about 5 micrometers to about 30 micrometers in diameter, and preferably from about 10 micrometers to about 20 micrometers.

Various suitable pigments or dyes may be employed as the colorant for the toner particles, such materials being well known, and including for example, carbon black, nigrosine dye, aniline blue, calco oil blue, chrome yellow, ultramarine blue, duPont oil red, methylene blue chloride, phthalocyanine blue and mixtures thereof. The pigment or dye should be present in sufficient quantity to render the toner composition highly colored so that it will form a clearly visible image on the recording member. For example, where conventional xerographic copies of documents are desired, the toner may comprise a black pigment such as carbon black or a black dye such as Amaplast black dye available from National Aniline Products Inc. Preferably, the pigment is employed in amounts from about 3 percent to about 20 percent by weight based on the total weight of toner, however, if the colorant employed is a dye, substantially smaller quantities of the color may be used.

As indicated herein, there can be incorporated in the toner (resin plus colorant) various enchancing additives, primarily for the purpose of imparting a positive charge to the toner resin. Examples of such additives include quaternary ammonium compounds, as described in U.S. Pat. No. 3,970,571, alkyl pyridinium halides including cetyl pyridinium chloride as described in U.S. Pat. No. 4,298,672, the disclosure of which is totally incorporated herein by reference, and sulfates, or sulfonates, reference U.S. Pat. No. 4,338,390, the disclosure of which is totally incorporated herein by reference.

As indicated hereinbefore, a very important and critical feature of the present invention resides in the incorporation into the apparatus of a brush device since substantial difficulties would be encountered in charging the toner particles in the charging nip without a means to convey the toner particles to this nip. Thus, without the brush device 21 the toner particles would remain in the reservoir, and unless another suitable mechanism was selected or the configuration of the device is altered allowing the toner particles to flow into the charging nip by gravity for example, the desirable charging of the toner particles may not occur. Moreover, the brush in the sump serves to clean residual toner particles remaining on the donor transport means, and further can act as a device for triboelectrically charging the toner particles to a low magnitude of charge. This is accomplished by applying a voltage $V_B$ to the brush 21. Generally, the toner particles are charged to about 2 microcoulombs per gram to about 25 microcoulombs per gram. This charge is not sufficient to allow the toner particles to be attracted in suitable quantities to the imaging member, therefore, further charging is necessary, which charging occurs in the charging situated between the metering charging roll means and the donor transport roll means.

Other modifications of the present invention will occur to those skilled in the art, based on a reading of the present disclosure and these modifications are intended to be included within the scope of the present invention. Specifically, the equivalent apparatuses which function in substantially a similar or equivalent manner to the apparatus and process of the present invention are intended to be included within the scope of the appended claims.

What is claimed is:

1. An apparatus for charging toner particles comprising, in operative relationship, a means for charging insulating toner particles and a means for transporting insulating toner particles, said means for charging and said means for transporting being charged to a predetermined potential, which apparatus further includes therein a brush device for delivering toner particles to a charging nip situated between the means for charging the toner particles and the means for transporting the toner particles, said brush having flexible bristles that are flexed as they enter a toner containing means and return to their initial, unflexed position as they exit the toner containing means such that toner particles contained on the bristles become airborne and thereby enter the charging nip, wherein the means for charging contains a triboelectrically active coating thereon, and the insulating toner particles are charged to a positive or negative polarity, the charging being accomplished in a charging zone situated between the means for charging and the means for transporting; wherein the means for charging is moving in a rotational direction opposite to the rotational direction of movement of the means for transporting, and the brush means is moving in a rotational direction opposite to the direction of movement of the means for charging.

2. An apparatus in accordance with claim 1 wherein wherein triboelectrically active coating is contained on the transporting means.

3. An apparatus in accordance with claim 1 wherein the means for transporting is a hard roll means.

4. An apparatus in accordance with claim 1 wherein the means for transporting is a belt deflected in an arc of from about 10 degrees to about 50 degrees.

5. An apparatus in accordance with claim 1 further including therein a means for imaging, and wherein the charged insulating toner particles are deposited thereon in image configuration.

6. An apparatus in accordance with claim 5 wherein the means for imaging is flexible or rigid.

7. An apparatus in accordance with claim 5 wherein the imaging means is comprised of a selenium photoconductor, or a layered organic photoconductive composition comprised of a substrate, a charge transport layer and a charge generating layer.

8. An apparatus for simultaneously metering, charging and transporting non-magnetic insulating toner particles comprising in operative relationship a metering roll means, an optional trim blade means for said metering roll means, a toner supply reservoir means containing therein weakly charged insulating toner particles possessing about an equal number of positive and negative charges thereon, a transporting means, a triboelectrically active coating contained on said transporting means, a drive roll means, an idler means, a tensioning means, an imaging means, a voltage source means for the drive roll means, and the transporting means, said metering roll means moving in a rotational direction opposite to the direction of movement of the transporting means, which apparatus further includes a brush device for delivering toner particles to a charging nip situated between the means for charging the toner particles and the means for transporting the toner particles, said brush having flexible bristles that are flexed as they enter a toner containing means and return to their initial, unflexed position as they exit the toner containing means such that toner particles contained on the bristles become airborne and thereby enter the charging nip.

9. An apparatus in accordance with claim 8 wherein the triboelectrically active coating is contained on the charging means.

10. An apparatus in accordance with claim 8 wherein the brush means is moving in a direction opposite to the direction of movement of the means for charging.

11. An apparatus in accordance with claim 8 wherein a voltage source means is connected to the brush means, and wherein a voltage of from about zero volts to about 300 volts are applied to the brush bristles.

12. An apparatus in accordance with claim 8 wherein the transport donor belt means traverses a path defined by the drive roll means and the idler roll means, causing the charged insulating toner particles to contact the imaging member means.

13. An apparatus in accordance with claim 8 wherein the imaging member means is a rigid or flexible imaging member.

14. An apparatus in accordance with claim 13 wherein the imaging member is comprised of amorphous selenium or amorphous selenium alloys; or wherein the imaging member is a layered photoresponsive device comprised of a substrate, a photogenerating layer and a charge transport layer.

15. An apparatus in accordance with claim 14 wherein the charge generating layer is vanadyl phthalocyanine or trigonal selenium, and the transport layer is comprised of diamime molecules dispersed in an inactive resinous binder.

16. An apparatus in accordance with claim 8 wherein there is applied to the metering roll means a voltage of from about +25 volts to about +200 volts, or from about −25 volts to about −200 volts; there is applied to the drive roll means a voltage of from about +75 volts to about +450 volts, or from about −75 volts to about −450 volts, and there is apaplied to the brush device a voltage of from about zero volts to about 300 volts.

17. An apparatus in accordance with claim 8 wherein the triboelectrically active coating is comprised of an electronegative or electropositive material in a thickness of 0.1 mils to about 5 mils.

18. An apparatus in accordance with claim 17 wherein the electronegative material is selected from the group consisting of trifluorochloroethylene and vinylchloride copolymers, polyvinylidene fluorides, polytetrachlorofluoroethylenes, perfluoroalkorylated ethylenes, polytetrachluoroalkoxy ethylenes, and polyvinylchlorides; and the electropositive materials are selected from the group consisting of polyvinylpyridines, terpolymers of methacrylates, and thermoplastic toner resins.

19. An apparatus in accordance with claim 8 wherein the transport donor belt is textured.

20. An apparatus for metering and charging non-magnetic insulating toner particles comprising in operative relationship a moving metering roll means, a compliant transport donor roll means containing thereon a triboelectrically active coating, a toner supply reservoir means containing therein weakly charged toner particles, a voltage source means for the compliant roller means, wherein toner particles are charged in a zone encompassed by said metering roll means and said compliant roll means, which apparatus further includes a brush device for delivering toner particles to a charging nip situated between the means for charging the toner particles and the means for transporting the toner particles, said brush having flexbile bristles that are flexed as they enter a toner containing means and return to their initial, unflexed position as they exit the toner containing means such that toner particles contained on the bristles become airborne and thereby enter the charging nip.

21. An apparatus in accordance with claim 20 wherein the brush device is situated in the toner supply reservoir, and is moving in a direction opposite to the direction of movement of the metering roll means.

22. An apparatus in accordance with claim 20 wherein said metering roll means is moving in a rotational direction opposite to the direction of movement of said compliant roll means.

23. An apparatus in accordance with claim 22 wherein the metering roll is a compliant roll.

24. An apparatus in accordance with claim 22 wherein positive or negative charges are applied to the toner particles.

25. An apparatus in accordance with claim 22 wherein the imaging member is flexible or rigid.

26. An apparatus in accordance with claim 25 wherein the imaging member is comprised on selenium deposited on the flexible substrate or an overcoated photoresponsive device comprised of a substrate, a photogenerating layer, and an amine transport layer.

27. An apparatus in accordance with claim 22 wherein there is applied to the metering roll means a voltage of from about +25 volts to about +200 volts, or from about −25 volts to about −200 volts; there is applied to the drive roll means a voltage of from about +75 volts to about +450 volts, or from about −75 volts to about −450 volts, and there is applied to the brush device a voltage of from about zero volts to about 300 volts.

28. An electrostatic imaging device comprised of a charging means, an imaging means, a development means and a fixing means, the improvement residing in the development means which is comprised of an apparatus for metering and charging non-magnetic insulating toner particles comprising in operative relationship a moving metering roll means, a compliant transport donor roll means, containing thereon a triboelectrically active coating, a toner supply reservoir means containing therein weakly charged toner particles, a voltage source means for the metering roll means, and a voltage source means for the compliant roller means, wherein toner particles are charged in a zone encompassed by said metering charging roll means and said compliant roll means, and wherein the apparatus further includes therein a moving brush device containing bristles thereon, wherein said brush conveys toner particles from the toner supply reservoir to the charging nip situated between the rollers, said bristles being flexible, which bristles are flexed as they enter the toner supply reservoir and return to their initial, unflexed position as they exit the toner supply reservoir such that toner particles contained on the bristles become airborne and thereby enter the charging nip.

29. An apparatus in accordance with claim 28 wherein the metering roll means is moving in a rotational direction opposite to the direction of movement of said compliant roll means.

30. An apparatus in accordance with claim 28 wherein the brush device is situated in the toner supply reservoir means.

31. An apparatus in accordance with claim 28 wherein the brush is moving in a direction opposite to the direction of movement of the metering roll.

32. An apparatus in accordance with claim 28 wherein the triboelectrically active coating is contained on the metering roll.

33. An apparatus in accordance with claim 28 wherein a voltage source means is connected to the brush means, and wherein a voltage of from about zero volts to about 300 volts are applied to the brush bristles.

34. An apparatus in accordance with claim 28 wherein the imaging member is comprised of amorphous selenium or amorphous selenium alloys; or wherein the imaging member is a layered photoresponsive device comprised of a substrate, a photogenerating layer and a charge transport layer.

35. An apparatus in accordance with claim 28 wherein the charge generating layer is vanadyl phthalocyanine or trigonal selenium, and the transport layer is comprised of diamine molecules dispersed in an inactive resinous binder.

36. An apparatus in accordance with claim 28 wherein there is applied to the metering roll means a voltage of from about +25 volts to about +200 volts, or from about −25 volts to about −200 volts; and there is applied to the brush device a voltage of from about zero volts to about 300 volts.

37. An apparatus in accordance with claim 28 wherein the triboelectrically active coating is comprised of an electronegative or electropositive materials.

38. An apparatus in accordance with claim 28 wherein the triboelectrically active coating is of a thickness of 0.1 mils to about 5 mils.

39. An apparatus in accordance with claim 37 wherein the electronegative material is selected from the group consisting of trifluorochloroethylene and vinylchloride copolymers, polyvinylidene fluorides, polytetrachlorofluoroethylenes, perfluoroalkoxylated ethylenes, polytetrafluoroalkoxy ethylenes, and polyvinylchloride; and the electropositive materials are selected from the group consisting of polyvinylpyridines, terpolymers of methacrylates, and thermoplastic toner resins.

40. An apparatus in accordance with claim 18 wherein the compliant roll is textured.

41. A process for charging toner particles which comprises (1) providing a moving toner transporting means, containing a triboelectrically active coating thereon, and a moving metering roll means; (2) providing a brush means containing flexible bristles thereon that are flexed as they enter a toner containing means and return to their initial, unflexed position as they exit the toner containing means such that toner particles contained on the bristles become airborne and thereby enter the charging nip, wherein uncharged toner particles supplied to the bristles of the brush means are triboelectrically charged, and (3) subsequently causing the charged toner particles to move to a charging zone by rotation of the brush means, which charging zone is situated between the toner transporting means and the metering charging roll means, whereat the toner particles are further triboelectrically charged.

42. A process in accordance with claim 41 wherein the triboelectrically active coating is contained on the metering roll.

43. A process in accordance with claim 41 wherein the brush is moving in a direction opposite to the direction of movement of the metering roll.

44. A process in accordance with claim 41 wherein a voltage source means is connected to the brush means, and wherein a voltage from about zero volts to about 300 volts are applied to the brush bristles.

45. A process in accordance with claim 41 wherein the transport donor belt means traverses a path defined by a drive roll means and an idler roll means, causing the charged insulating toner particles to contact an imaging member means.

46. A process in accordance with claim 41 wherein the imaging member is comprised of amorphous selenium or amorphous selenium alloys; or wherein the imaging member is a layered photoresponsive device comprised of a substrate, a photogenerating layer and a charge transport layer.

47. A process in accordance with claim 46 wherein the charge generating layer is vanadyl phthalocyanine or trigonal selenium and the transport layer is comprised of diamine molecules dispersed in an inactive resinous binder.

48. A process in accordance with claim 46 wherein there is applied to the metering roll means a voltage of from about +25 volts to about +200 volts, or from about −25 volts to about −200 volts; and there is applied to the brush device a voltage of from about zero volts to about 300 volts.

49. A process in accordance with claim 46 wherein the triboelectrically active coating is comprised of an electronegative or electropositive materials.

50. A process in accordance with claim 46 wherein the triboelectric coating is of a thickness of 0.1 mils to about 5 mils.

51. A process in accordance with claim 49 wherein the electronegative material is selected from the group consisting of trifluorochloroethylene and vinylchloride copolymers, polyvinylidene fluorides, polytetrachlorofluoroethylenes, perfluoroalkoxylated ethylenes, polytetrafluoroalkoxy ethylenes, and polyvinylchlorides; and the electropositive materials are selected from the group consisting of polyvinylpyridines, terpolymers of methacrylates, and thermoplastic toner resins.

52. An apparatus for charging toner particles consisting essentially of in operative relationship a means for charging insulating toner particles, said means for charging having a triboelectrically active coating thereon, and a means for transporting insulating toner particles, said means for charging and said means for transporting being charged to a predetermined potential, which apparatus further includes therein a brush device which simultaneously causes mixing of toner particles, effects precharging of uncharged toner particles, and transports the precharged toner particles to a charging nip situated between the means for charging the toner particles and the means for transporting the toner particles, said brush having flexible bristles that are flexed as they enter a toner containing means and return to their initial, unflexed position as they exit the toner containing means such that toner particles contained on the bristles become airborne and thereby enter the charging nip.

53. An apparatus in accordance with claim 52 wherein a triboelectrically active coating is present on the transporting means.

54. An apparatus in accordance with claim 52 wherein a triboelectrically active coating is present on the charging means.

55. An apparatus in accordance with claim 52 wherein the brush means is moving at a speed of from about 200 revolutions per minute to about 1,500 revolutions per minute.

56. An apparatus in accordance with claim 52 wherein the brush bristles are about 0.500 inches in length, and about 0.007 inches in diameter.

57. An improved process for charging toner particles consisting essentially of (1) providing a moving toner transporting means, containing a triboelectrically active coating thereon, and a moving metering roll means; (2) providing a brush means with flexible bristles thereon that are flexed as they enter a toner containing means and return to their initial, unflexed position as they exit the toner containing means such that toner particles contained on the bristles become airborne and thereby enter the charging nip, which brush means simultaneously effects precharging of uncharged toner particles, mixing of the toner particles, and accomplishes transporting of the precharged toner particles to a charging zone by rotation of the brush means, which charging zone is situated between the toner transporting means and the metering charging roll means, whereat the precharged toner particles are further triboelectrically charged.

58. A process in accordance with claim 57 wherein the toner particles are transported to the charging nip by a flicking action of the bristles present on the brush means.

59. A process in accordance with claim 57 wherein the triboelectrically active coating is present on the metering roll means.

60. A process in accordance with claim 57 wherein the brush is rotated at a speed of from about 200 revolutions per minute to about 1,500 revolutions per minute.

61. A process in accordance with claim 57 wherein the bristles present on the brush are about 0.500 inches in length, and about 0.007 inches in diameter.

62. An apparatus in accordance with claim 2 wherein the brush device contains bristles thereon of a sufficient length to enable toner particles to be easily removed therefrom and subsequently directed to said charging zone.

63. An apparatus in accordance with claim 62 wherein the bristles are of a length of at least 0.5 inches.

64. An apparatus in accordance with claim 9 wherein the bristles present on the brush are of a sufficient length to enable toner particles to be easily removed therefrom and directed to said charging zone.

65. An apparatus in accordance with claim 64 wherein the bristles are of a length of at least 0.5 inches.

66. An apparatus in accordance with claim 20 wherein the brush fibers are of a sufficient length to enable toner particles to be easily removed therefrom and directed to said charging zone.

67. An apparatus in accordance with claim 66 wherein the bristles are of a length of at least 0.5 inches.

68. An apparatus in accordance with claim 28 wherein the brush fibers are of a sufficient length to enable toner particles to be easily removed therefrom and directed to said charging zone.

69. An apparatus in accordance with claim 68 wherein the bristles are of a length of at least 0.5 inches.

70. An apparatus in accordance with claim 1 wherein the triboelectrically active coating comprises a material selected from the group consisting of: trifluorochloroethylene/vinyl chloride copolymers, polyvinylidene fluoride, polytetrafluoroethylenes, perfluoroalkoxylated ethylenes, polytetrafluoroethylenes, polyvinyl chlorides, polyvinylpyridines, terpolymers of methacrylates, and thermoplastic toner resins.

71. An apparatus in accordance with claim 20 wherein the triboelectrically active coating comprises a material selected from the group consisting of: trifluorochloroethylene/vinyl chloride copolymers, polyvinylidene fluoride, polytetrafluoroethylenes, perfluoroalkoxylated ethylenes, polytetrafluoroethylenes, polyvinyl chlorides, polyvinylpyridines, terpolymers of methacrylates, and thermoplastic toner resins.

72. An apparatus in accordance with claim 52 wherein the triboelectrically active coating comprises a material selected from the group consisting of: trifluorochloroethylene/vinyl chloride copolymers, polyvinylidene fluoride, polytetrafluoroethylenes, perfluoroalkoxylated ethylenes, polytetrafluoroethylenes, polyvinyl chlorides, polyvinylpyridines, terpolymers of methacrylates, and thermoplastic toner resins.

73. A process in accordance with claim 57 wherein the triboelectrically active coating comprises a material selected from the group consisting of: trifluorochloroethylene/vinyl chloride copolymers, polyvinylidene fluoride, polytetrafluoroethylenes, perfluoroalkoxylated ethylenes, polytetrafluoroethylenes, polyvinyl chlorides, polyvinylpyridines, terpolymers of methacrylates, and thermoplastic toner resins.

74. An apparatus in accordance with claim 1 wherein the brush bristles have a length to diameter ratio of about 71 to 1 and comprise a material selected from the group consisting of nylon, stainless steel, brass, a composite material comprising nylon with carbon, a composite material comprising nylon with brass, and a composite material comprising nylon with steel.

75. An apparatus in accordance with claim 20 wherein the brush bristles have a length to diameter ratio of about 71 to 1 and comprise a material selected from the group consisting of nylon, stainless steel, brass, a composite material comprising nylon with carbon, a composite material comprising nylon with brass, and a composite material comprising nylon with steel.

76. An apparatus in accordance with claim 52 wherein the brush bristles have a length to diameter ratio of about 71 to 1 and comprise a material selected from the group consisting of nylon, stainless steel, brass, a composite material comprising nylon with carbon, a composite material comprising nylon with brass, and a composite material comprising nylon with steel.

77. A process in accordance with claim 57 wherein the brush bristles have a length to diameter ratio of about 71 to 1 and comprise a material selected from the group consisting of nylon, stainless steel, brass, a composite material comprising nylon with carbon, a composite material comprising nylon with brass, and a composite material comprising nylon with steel.

* * * * *